United States Patent [19]
Mano et al.

[11] Patent Number: 5,189,407
[45] Date of Patent: Feb. 23, 1993

[54] MULTI-COLOR DISPLAY SYSTEM

[75] Inventors: Hiroyuki Mano; Terumi Takashi, both of Yokohama; Toshio Futami; Tatsuhisa Fujii, both of Mobara, all of Japan

[73] Assignee: Hitachi, Ltd., Tokyo, Japan

[21] Appl. No.: 506,190

[22] Filed: Apr. 9, 1990

[30] Foreign Application Priority Data

Apr. 10, 1989 [JP] Japan .................................. 1-90222

[51] Int. Cl.$^5$ .............................................. G09G 3/00
[52] U.S. Cl. ...................................... 340/793; 340/703
[58] Field of Search ........................ 340/703, 793, 791

[56] References Cited

U.S. PATENT DOCUMENTS

| | | | |
|---|---|---|---|
| Re. 33,532 | 2/1991 | Ishii | 340/703 |
| 4,193,095 | 3/1980 | Mizushima | 340/793 |
| 4,626,835 | 12/1986 | Nienaber et al. | 340/703 |
| 4,642,628 | 2/1987 | Murata | 340/784 |
| 4,739,313 | 4/1988 | Oudshoorn et al. | 340/703 |
| 4,769,713 | 9/1988 | Yasui | 340/703 |
| 4,808,991 | 2/1989 | Tachiuchi et al. | 340/793 |
| 4,921,334 | 5/1990 | Akodes | 340/793 |

FOREIGN PATENT DOCUMENTS

| | | |
|---|---|---|
| 3313804 | 10/1982 | Fed. Rep. of Germany . |
| 3610916 | 3/1985 | Fed. Rep. of Germany . |
| 57-144590 | 3/1981 | Japan . |
| 63-210888 | 2/1987 | Japan . |

Primary Examiner—Alvin E. Oberley
Assistant Examiner—Amare Mengistu
Attorney, Agent, or Firm—Antonelli, Terry, Stout & Kraus

[57] ABSTRACT

An improved multi-color liquid crystal display system which is capable of making visual color representation of more than eight colors in a display panel, such as a liquid crystal display panel which is composed of liquid crystal cells having three primary color filters attached thereto. Lightness of a cell is controlled by causing the cell to be in "ON" state during M frames out of N frames (N>M) to thereby provide half-tone color representation of the cell. This enables increase of the number of colors represented with the three primary color cells more than eight by combining "ON", "OFF" and the "half-tone" states of the three primary color cells.

13 Claims, 9 Drawing Sheets

FIG. 3

| INPUT DATA | | | | DISPLAY DATA | | | REPRESENTED COLOR |
|---|---|---|---|---|---|---|---|
| I | R | G | B | R | G | B | |
| 0 | 0 | 0 | 0 | 0 | 0 | 0 | BLACK |
| 0 | 0 | 0 | 1 | 0 | 0 | 1 | BLUE |
| 0 | 0 | 1 | 0 | 0 | 1 | 0 | GREEN |
| 0 | 0 | 1 | 1 | 0 | 1 | 1 | CYAN |
| 0 | 1 | 0 | 0 | 1 | 0 | 0 | RED |
| 0 | 1 | 0 | 1 | 1 | 0 | 1 | MAGENTA |
| 0 | 1 | 1 | 0 | 1 | 1 | 0 | YELLOW |
| 0 | 1 | 1 | 1 | 1 | 1 | 1 | WHITE |
| 1 | 0 | 0 | 0 | MR | MG | MB | GRAY |
| 1 | 0 | 0 | 1 | MR | MG | 1 | LIGHT BLUE |
| 1 | 0 | 1 | 0 | MR | 1 | MB | LIGHT GREEN |
| 1 | 0 | 1 | 1 | MR | 1 | 1 | LIGHT CYAN |
| 1 | 1 | 0 | 0 | 1 | MG | MB | LIGHT RED |
| 1 | 1 | 0 | 1 | 1 | MG | 1 | LIGHT MAGENTA |
| 1 | 1 | 1 | 0 | 1 | 1 | MB | LIGHT YELLOW |
| 1 | 1 | 1 | 1 | 1 | 1 | 1 | WHITE |

| INPUT DATA | | | | DISPLAY DATA | | | REPRESENTED COLOR |
|---|---|---|---|---|---|---|---|
| I | R | G | B | R | G | B | |
| 0 | 0 | 0 | 0 | 0 | 0 | 0 | BLACK |
| 1 | 0 | 0 | 0 | 1/3 | 1/3 | 1/3 | LIGHT BLACK |
| 0 | 1 | 1 | 1 | 2/3 | 2/3 | 2/3 | DARK WHITE |
| 1 | 1 | 1 | 1 | 1 | 1 | 1 | WHITE |

FIG. 10
PRIOR ART

|     | X1 | X2 | X3 | X4 |     | X1279 | X1280 |
|-----|----|----|----|----|-----|-------|-------|
| Y1  | R  | G  | R  | G  | --- | R     | G     |
| Y2  | B  | W  | B  | W  | --- | B     | W     |
| Y3  | R  | G  | R  | G  | --- | R     | G     |
| Y4  | B  | W  | B  | W  | --- | B     | W     |
| Y799| R  | G  | R  | G  | --- | R     | G     |
| Y800| B  | W  | B  | W  | --- | B     | W     |

1 DOT

MULTI-COLOR DISPLAY SYSTEM

BACKGROUND OF THE INVENTION

1. Field of the Invention

The present invention relates to a multi-color display system, and particularly to a multi-color display system using a liquid crystal display panel or the like.

2. Description of the Prior Art

In a conventional multi-color liquid crystal display system, each of visual information dots is composed of four liquid crystal cells with red, blue, green and white filters respectively provided thereon. Eight colors can be presented by combination of ON-OFF controls of the red, blue and green liquid crystal cells, and additional eight colors can be presented by addition of ON-OFF control of the white liquid crystal cell to each combination of ON-OFF controls of the red, blue and green liquid crystal cells. Thus, sixteen colors are available in total.

One of such conventional multi-color liquid crystal display systems is described below with reference to FIG. 10, FIG. 10 shows one example of a liquid crystal panel used in the conventional multi-color liquid crystal display system. It has a display area of 640×400 dots. One dot is composed of 2×2 liquid crystal cells, and therefore the panel has 1280 (=640×2) cells aligned in each horizontal line and 800 (=400×2) cells aligned in each vertical line. As described above, eight colors can be presented by combination of ON-OFF controls of the red, blue and green liquid crystal cells, and additional eight colors can be presented by addition of ON-OFF control of the white liquid crystal to each combination of ON-OFF controls of red, blue and green liquid crystal cells, thus providing totally sixteen colors.

A similar multi-color representation is described in Japanese Laid-open Patent Application No. 63-210888.

The above described prior art requires liquid crystal cells four times the number of the display dots, causing an active matrix type liquid crystal display using thin film transistors to suffer from reduction of yield due to the increase of the number of thin film transistors, and accordingly unit cost of the liquid crystal display panel is increased.

Also, a twisted nematic type liquid crystal will suffer from decrease in display duty cycle of each display line, which decrease lowers the contrast in display.

SUMMARY OF THE INVENTION

One object of the present invention is to provide a multi-color display system which is capable of representing more than eight colors with three display cells having primary color filters attached thereto (no white filter used), without adverse effect on the display duty cycle.

Another object of the present invention is to provide a multi-color display system which permits representation of colors of different intensities or lightnesses for each of eight fundamental colors.

Still another object of the present invention is to provide a multi-color display system which can provide colors of different intensities or lightnesses for each of eight fundamental colors to meet the characteristics of the liquid crystal display panel.

According to an aspect of the present invention, there is provided a multi-color display system in which each of visual information dots is composed of three liquid crystal cells each having a different primary color filter thereon to provide multi-color representation under ON-OFF control of each of the liquid crystal cells, characterized in that each of the liquid crystal cells is capable of being controlled to provide a half-tone representation with combination of said ON-OFF controls thereof, and that, for colors represented by said three liquid crystal cells at least one of which is in the "OFF" state, the liquid crystal cells to be in the "OFF" state are allowed to be controlled to provide said half-tone representation whereby more than eight colors are represented with said three liquid crystal cells.

In this multi-color display system, another half-tone representation of the liquid crystal cells may be added for the color represented by the three liquid crystal cells which are all in the "ON" state and wherein the lightness of said another half-tone representation is higher than that of the half-tone representation for the color represented by the three liquid crystal cells which are all in the "OFF" state.

The half-tone representation may be performed by putting a selected liquid crystal cell in the "ON" state during M frames out of N frames (N>M).

In another aspect of the present invention, there is provided a multi-color display system in which each of visual information dots is composed of three primary-color display cells to provide multi-color representation under ON-OFF control of each of the display cells, characterized in that each of the display cells is capable of being controlled to provide a half-tone representation with combination of said ON-OFF controls thereof, and that, for colors represented by said three display cells at least one of which is in the "OFF" state, the display cells to be in the "OFF" state are allowed to be controlled to provide said half-tone representation whereby more than eight colors are represented with the three display cells.

Specifically, a multi-color display system according to the present invention comprises:

a display panel having a multitude of three primary-color display cells which are arranged in the form of matrix, each set of the three primary color display cells making up one dot of visual color representation under ON-OFF control of each of the display cells;

apparatus for producing a half-tone display signal which causes a selected display cell to be in the "ON" state during M frames out of N frames (N>M); and apparatus responsive to said half-tone display signal and at least four-bit display data, three bits of which are used to control the respective three primary color display cells, for substituting said half-tone display signal for any bit signal of said three bits depending upon the fourth bit of the display data, said any bit signal indicating the "OFF" state of a selected display cell.

In this system, the apparatus for producing a half-tone display signal may be provided for each of the three primary colors, each of said apparatus capable of having different sets of the values of N and M.

Alternatively, the apparatus for producing a half-tone display signal may be provided for each of colors represented by the three primary colors, each of said apparatus capable of having different sets of the values of N and M.

Further, the apparatus for producing a half-tone display signal may include a first circuit for producing a first half-tone display signal which causes a selected display cell to be in the "ON" state during M1 frames out of N1 frame (N1>M1); a second circuit for producing a second half-tone display signal which causes a selected display cell to be in the "ON" state during M2 frames out of N2 frames (N2>M2); and a circuit for selecting one of said first and second half-tone display signals to be outputted therefrom.

The present invention also provides a multi-color display control apparatus used for a display device which includes a liquid crystal panel composed of a multitude of liquid crystal cells arranged in the form of matrix each of the cells having a different primary color filter thereon; and a driver adapted to receive several times a plurality of parallel display data to acquire a full line of display data such that a visual information dot is composed of a set of three liquid crystal cells aligned in a horizontal line, each of the cells being ON-OFF controlled according to the display data, the apparatus comprising:

apparatus for producing a half-tone display signal which causes a selected liquid crystal cell to be in the "ON" state during M frames out of N frames;

apparatus responsive to said half-tone display signal and at least four-bit display data, three bits of which are used to control the respective three primary color liquid crystal cells, for substituting said half-tone display signal for any bit signal of said three bits depending upon the fourth bit of the display data, said any bit signal indicating the "OFF" state of a selected liquid crystal cell;

serial-to-parallel converters for converting serial display data for each primary color outputted from said means for substituting into parallel display data; and apparatus for selecting parallel data of a predetermined number of bits out of said parallel display data for each primary color such that said parallel data meet the three primary color arrangement of the liquid crystal cells aligned in a horizontal direction.

A multi-color display system according to the present invention uses a display device, such as liquid crystal display panel which is composed of display cells, each having two display states under ON-OFF control. In such display device, three display cells which together make up a single dot, are allotted to the three primary colors, respectively. The display format thus constituted can usually produce only eight different colors.

In order to provide visual representation of more than eight colors with three display cells allotted to the three primary colors, the present invention employs half-tone or half lightness representation of the display cells. This increases the number of display states permitted for each display cell, and accordingly the number of combination of such permitted display states of the three display cells, and hence increasing the number of visual color representations. While visual representation of eight colors requires three-bit display data, that of sixteen colors requires one more additional bit. The doubling of the number of colors can be attained by substituting a half-tone signal for one of the logical signals "1" and "0" of each of said three-bit display data, depending upon a selected condition (for instance, logical "1") of the additional bit of the display data. In an attempt to improve the quality of visual color representation, a half-tone signal is outputted as a substitute for the display data indicating "OFF" state (for instance, logical "0").

A half-tone color representation of the display cell may be obtained by bringing it to "ON" state during M frames out of N frames (N>M). The lightness, tone or other optical characteristics of the half-tone color representation can be controlled by changing the frame numbers of M and N. By performing this control on each of the primary colors or represented colors, undesired difference between the optical characteristics of the color filters or display cells can be reduced or compensated for, and the lightness of each represented color can be controlled.

Other objects and advantages of the present invention will be better understood from the following description of multi-color display systems according to preferred embodiments of the present invention.

BRIEF DESCRIPTION OF THE INVENTION

FIG. 3 shows a table describing the functions of an R-selection circuit, a G-selection circuit and a B-selection circuit appearing in FIG. 1;

FIG. 10 is a diagramatic representation of color liquid crystal display system.

DESCRIPTION OF PREFERRED EMBODIMENTS

FIGS. 1 to 5 there is shown a multi-color liquid crystal display system according to the first embodiment of the present invention.

Figure 1:
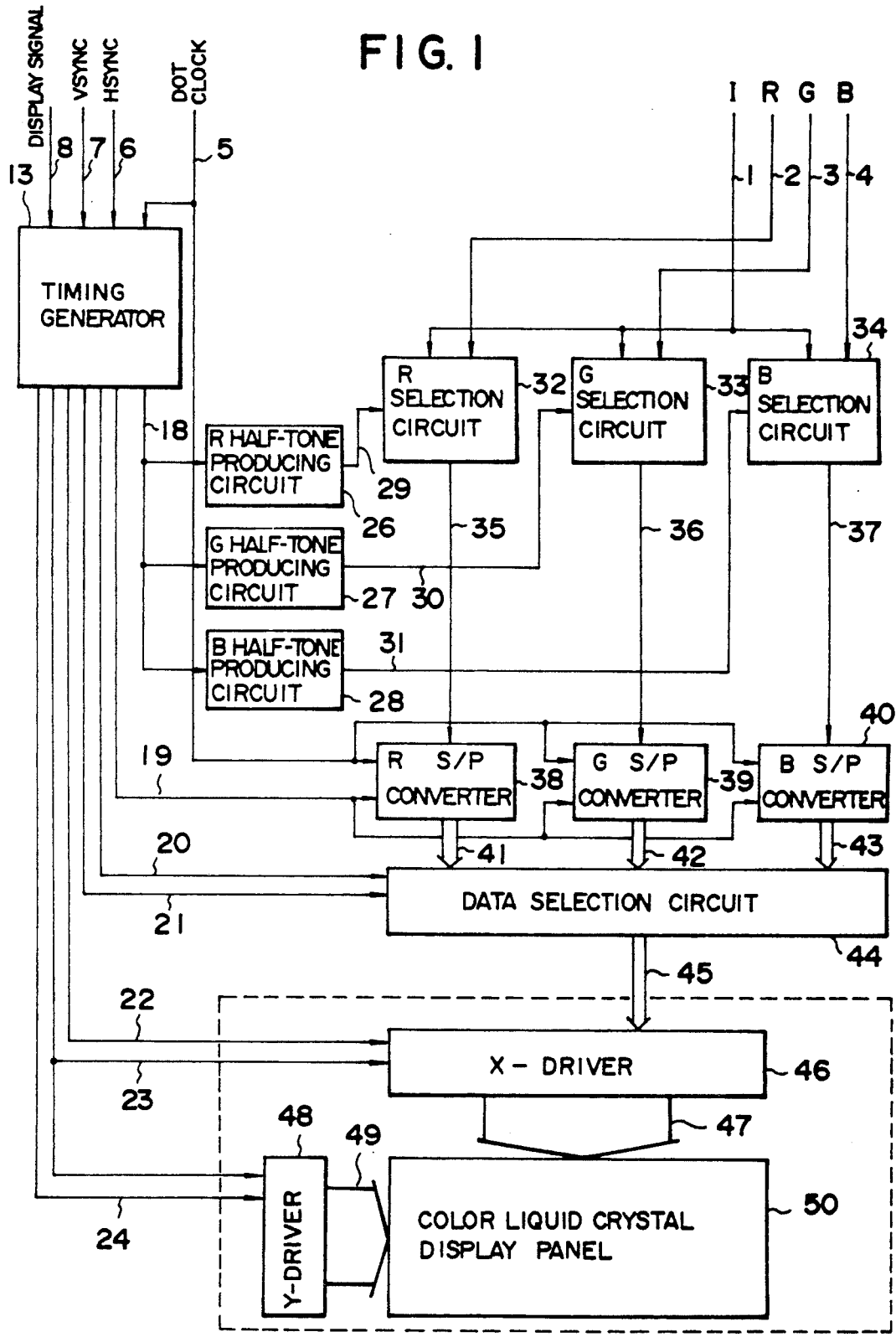
FIG. 1 is a block diagram of a multi-color liquid crystal display system according to a first embodiment of the present invention.

FIG. 1 is a block diagram of a multi-color liquid crystal display system which is capable of providing a visual color representation of fifteen colors. In the drawing, input data signals (I, R. G and B data) are indicated at 1 to 4; a dot clock signal which is synchronous with input data signals 1 to 4 is indicated at 5; a horizontal synchronous signal is indicated at 6; and vertical synchronous signal is indicated at 7. Input data signals 1 to 4 carry display data to be used for making up a single picture during a single frame period of vertical synchronous signal 7 (hereinbelow referred to as "frame period" or "frame"). Display signal 8 indicates valid durations with logical '1' during which input data to be displayed is present. A timing generator 13 is responsive to the dot clock signal 5, horizontal synchronous signal 6, vertical synchronous signal 7 and display signal 8, for generating various timing signals. A frame end signal 18 is formed from the vertical synchronous signal 7; four-dot clock signal 19 is made synchronous with the display signal 8, and is used for retrieving visual information every four dots; signals 20 and 21 represent count values A and B indicating four divisional positions within the period of the four-dot clock signal 19 according to combination of the count values A and B; signal 22 is liquid crystal data shift clock; signal 23 is liquid crystal horizontal clock signal; and signal 24 is liquid crystal head line signal. These signals 18 to 24 are formed in the timing control circuit 13.

R half-tone producing circuit is indicated at 26; G half-tone producing circuit is indicated at 27; and B half-tone producing circuit is indicated at 28. Each of the half-tone producing circuits is responsive to the frame end signal 18 for putting selected liquid crystal cells in condition for "display on" during M frames out of N frames and in condition for "display off" in (N-M) frames (N and M : integers : N>M). The signals appearing at the output terminals of these half-tone producing circuits are indicated at 29 to 31, respectively, and are referred to as R half-tone display signal; G half-tone display signal and B half-tone display signal, respectively. R selection circuit is indicated at 32, G selection circuit is indicated at 33, and B selection circuit is indicated at 34. When input data signal I is logical "0", the R selection circuit 32 allows input data signal R to pass therethrough. When input data signal I is logical "1" and input data signal R is logical "1", the R selection circuit 32 allows the input data signal R to pass therethrough, whereas when input data signal I is logical "1" and input data signal R is logical "0", the R selection circuit 32 allows R half-tone display signal 29 to pass therethrough. In short, the R selection circuit 32 usually allows input data signal R to pass therethrough, and only when input data signal I is logical "0", the R selection circuit 32 allows R half-tone display signal 29 to appear at its output terminal in place of the input data R of logical "0". Likewise, the other G and B selection circuits 33 and 34 function in dependence on different combinations of input data signals (I, G) and (I, B), respectively. R display data signal 35 is outputted from R selection circuit 32; G display data signal 36 is outputted from G selection circuit 33; and B display data signal 37 is outputted from B selection circuit 34. R serial-to parallel converter circuit 38 receives the output of the R selection circuit 32; G serial-to-parallel converter circuit 39 receives the output of the G selection circuit 33; and B serial-to-parallel converter circuit 40 receives the output of the selection circuit 34. Each serial-to-parallel converter circuit functions to shift the serially inputted display data four steps with the aid of the dot clock signal 5, and then latch the shifted display data with the aid of four-dot clock signals 19, thus converting the serially inputted display data to four-bit parallel data. Specifically, R parallel data 41 is outputted from R serial-to-parallel converter circuit 38; G parallel data 42 is outputted from G serial-to-parallel converter circuit 39; and B parallel data 43 is outputted from B serial-to-parallel converter circuit 40. Liquid crystal data selection circuit 44 functions to allow four-bit of each R, G and B parallel, data 41, 42 and 43 to sequentially pass therethrough for every four dots of the display line to meet this particular liquid crystal panel. Liquid crystal display data signal 45 appears at the output terminal of the liquid crystal data selection circuit 44. X-drive circuit 46 functions to latch the liquid crystal display data 45 of a single display line in synchronous with the liquid crystal data shift clock signal 22, and apply all the data to the liquid crystal panel in synchronous with the liquid crystal horizontal clock signal 23. X-display data 47 of a single display line, appears at the output terminal of X-drive circuit 46. Y-drive circuit is indicated at 48. Scanning line data 49 appears at the output terminal of Y-drive circuit 48. The Y-drive circuit 48 allows liquid crystal top line signal 24 to enter therein in response to the liquid crystal horizontal clock signal 23, causing the 1st line of scanning line data 49 to be "1", and then shifting the "1" to the next line sequentially in synchronism with liquid crystal horizontal clock signal 23. Color liquid crystal panel 50 functions to permit display of X-display 20 data 47 on the "1" line of scanning line data 49 and keep the visual representation for one frame period. The whole display area will be swept line by line in synchronism with the liquid crystal horizontal clock signal 23 for one frame period, thereby performing a visual representation of one frame.

Figure 2:
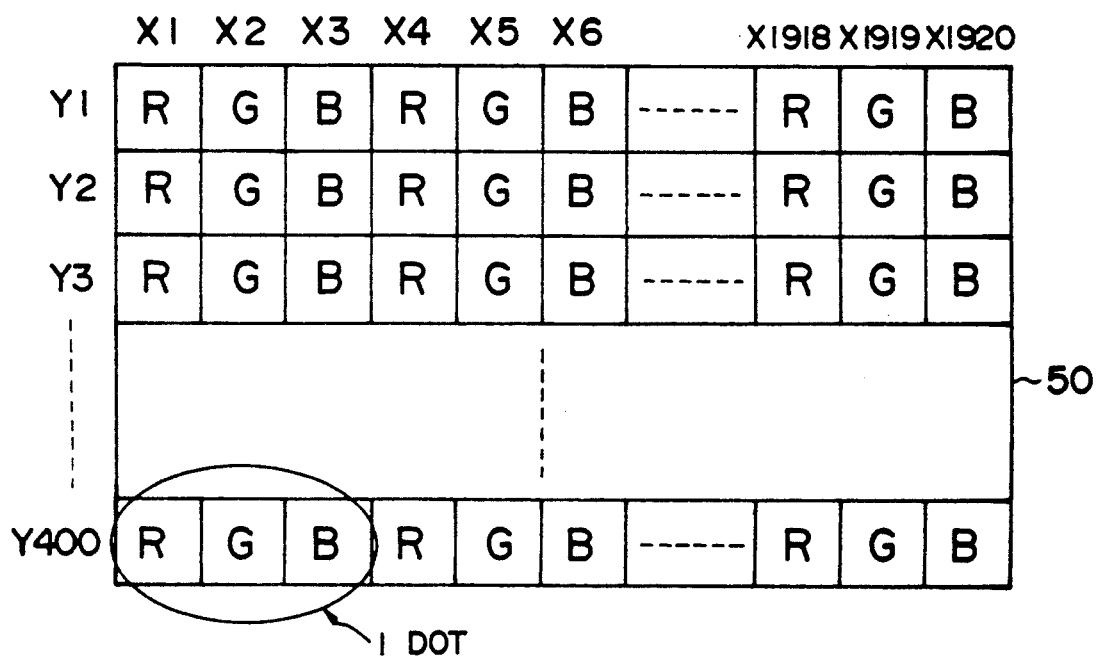
FIG. 2 is a diagramatic representation of color liquid crystal display panel to be used in the multi-color display system of FIG. 1.
Figure 4:
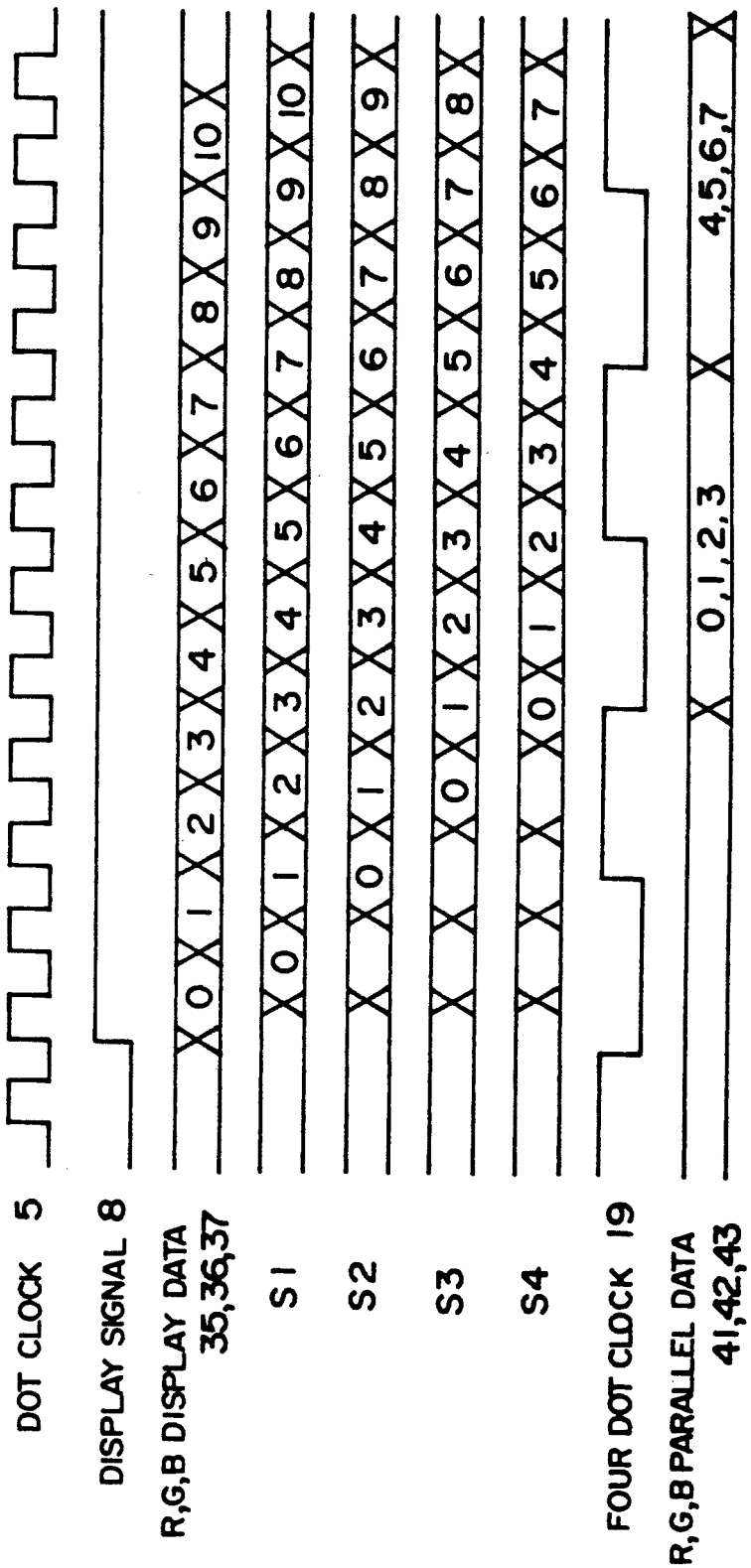
FIG. 4 is a timing chart describing the functions of an R serial-to parallel converter circuit, a G serial-to-parallel converter circuit and a B serial-to-parallel converter circuit.

In a case where color liquid crystal panel 50 in FIG. 1 has resolution of 640×400 dots, that is 1920 (=640×3) liquid crystal pixels are arranged in horizontal direction whereas 400 liquid crystal pixels are arranged in vertical direction. Red, green and blue filters are attached to the pixels in horizontal direction in the order named, as seen in FIG. 2. Three liquid crystal cells having red, green and blue filters attached thereto, together make up a single dot, and eight colors can be represented by combination of "ON" and "OFF" states of these three liquid crystal cells. The present invention should not be understood as being limited to use of this particular liquid crystal panel arrangement. It is enough if a set of red, green and blue pixels makes up a single dot, no matter how they may be arranged.

In this particular embodiment seven colors can be added to the eight colors by permitting half-tone display for each of the red, green and blue pixels of "OFF" state by the thinning-out operation. Thus, fifteen colors can be available in total (in case of white representation, all red, green and blue pixels are put in "ON" state, that is, no pixel is in condition for the half-tone display, resulting in no increase of the number of colors for the white representation).

Drive circuits for providing fifteen color visual representation are described below:

In FIG. 1, each half-tone producing circuit 26-28 provides half-tone display signals 29-31, which will be "1" only in M frames out of N frames in accordance with frame end signal 18. The values of M and N (N>M) depend on different color representation and the characteristics of the filters. In this particular embodiment, for example R half-tone producing circuit 26 provides an R half-bright display signal which becomes "1" for one frame out of two frames in accordance with the frame end signal 18; G half-tone producing circuit 27 provides a G half-tone display signal which becomes "1" for one frame out of three frames in accordance with the frame end signal 18; and similarly B half-brightness producing circuit 28 provides a B half-tone display signal which becomes "1" for two frames out of five frames in accordance with the frame end signal 18. R selection circuit 32, G selection circuit 33 and B selection circuit 34 are controlled by combination of input data signals I, R, G and B. Specifically, when I input data is "0", R selection circuit 32 allows R input data to pass therethrough. When I input data is "1", and when R input data is "1", R selection circuit 32 allows the R input data to pass therethrough. When I input data is "1", and when R input data is "0", R selection circuit 32 allows the R half-tone display signal 29 to pass therethrough. Likewise, when I input data is "0", G selection circuit 33 allows the G input data to pass therethrough. When I input data is "1", and when G input data is "1", G selection circuit 33 allows the G input data to pass therethrough. When I input data is "1", and when G input data is "0", G selection circuit 33 allows G half-tone display signal 30 to pass therethrough. In a similar way, B selection circuit 34 selectively allows "1", "0" or B half-tone display signal 31 to pass therethrough depending on combination of input data I and B. These are listed in a table shown in FIG. 3. In this table, R half-tone display signal 29 is abbreviated as "MR"; G half-tone display signal 30 is abbreviated as "MG"; and B half-tone display signal 31 is abbreviated as "MG". Also shown in the table are represented colors on the color liquid crystal panel 50.

Figure 5:
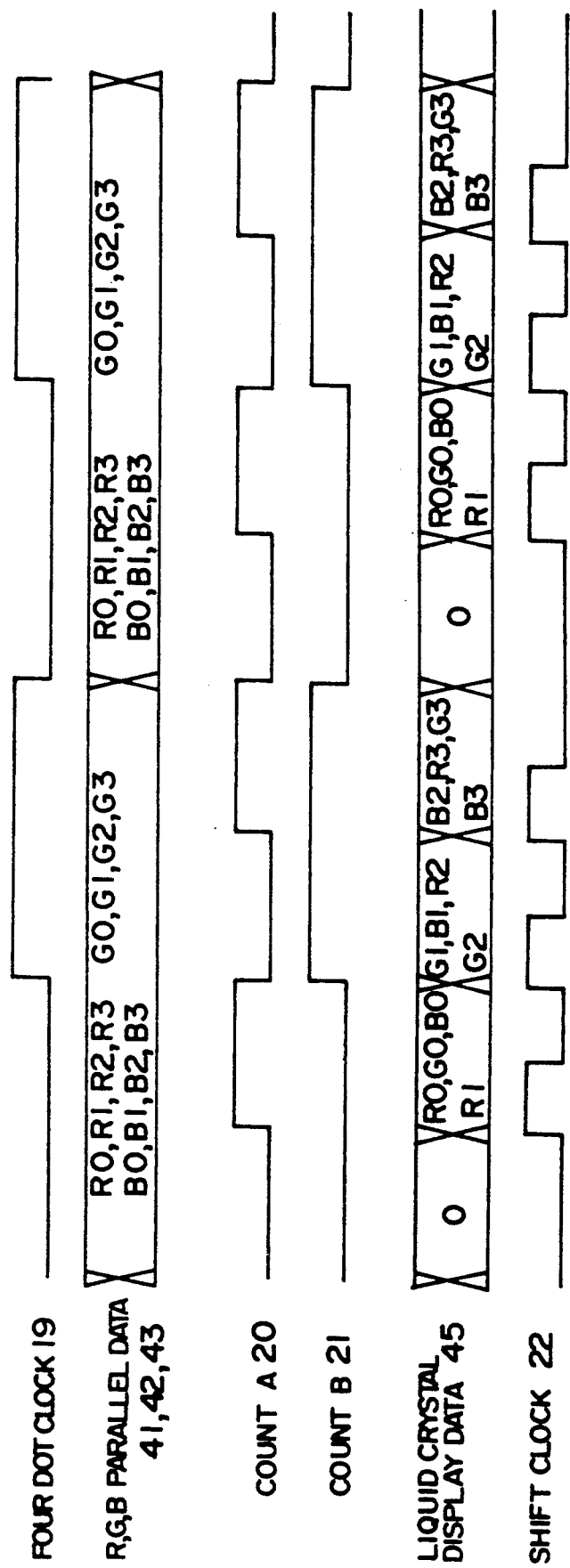
FIG. 5 is a timing chart describing the functions of the liquid crystal data selection circuits appearing in FIG. 1.

R display data 35 is directed from the R selection circuit 32 to R serial-to-parallel circuit 38; G display data 36 is directed from the G selection circuit 33 to G serial-to-parallel circuit 39; and B display data 37 is directed from the B selection circuit 34 to B serial-to-parallel circuit 40. As seen from the timing chart of FIG. 4, these display data are shifted by dot clock signal 5 as indicated at S1, S2, S3 and S4, and the shifted display data are latched as four-bit parallel data at the falling edge of each four-dot clock signal 14 which is synchronized with display signal 8. Thus, R parallel data 41, G parallel data 42 and B parallel data 43 are present at outputs of converters 38 to 40. Assuming that these four-bit parallel data are R parallel data 41 (R0, R1, R2, R3), G parallel data 42 (G0, G1, G2, G3), and B parallel data 43 (B0, B1, B2, B3), as shown in FIG. 5, liquid crystal data selection circuit 44 is responsive to counts B21 and A20, which change from (0, 0) to (0, 1), (1, 0) and (1, 1) sequentially within one period of four-dot clock signal 19, for selecting "0"s for count (0, 0); four bits (R0, G0, B0, R1) for count (0, 1); four bits (G1, B1, R2, G2) for count (1, 0); and four bits (B2, R3, G3, B3) count (1, 1). Thus these four-bits sequentially appear as data 45. These liquid crystal display data 45 are allowed to enter X-drive circuit 46 in the order of (R0, G0, B0, R1), (G1, B1, R2, G2), and (B2, R3, G3, B3) in synchronism with liquid crystal data shift clock signal 22. Here, it should be noted that no liquid crystal data shift clock signal 22 appears when counts B21 and A20 are (0, 0), and therefore the liquid crystal display data 45 at that time is not taken into the X-drive circuit 46. By repeating this procedure, a full line of display data thus taken into X-drive circuit 46 is allowed to appear at its output terminals as X-display data 47 in response to the liquid crystal horizontal clock 23. Specifically, X-drive circuit 46 takes liquid crystal display data 45 four bits by four bits until a full line of display data is obtained. Thus, the outputted data is in the order of (R0, G0, B0, R1, G1, B1, R2, G2, B2 . . . ) to meet the dot arrangement of color liquid crystal panel 50 as shown in FIG. 2. (R0, G0, B0) makes up one dot; (R1, G1, B1) makes up another dot and so forth with combination of the display data providing fifteen-color representation as shown in FIG. 3.

In this particular embodiment, X-drive circuit 46 is designed to receive each four-bit display data at a time, but it can be designed to receive any number of bits of display data at a time by modifying serial-to-parallel converter circuits 38 to 40, liquid crystal data selection circuit 44 and associated control signals.

With regard to input data (I, R, G, B) in the above described embodiment, black is represented with input data (I, R, G, B) of (0, 0, 0, 0); gray is represented with input data (I, R, G, B) of (1, 0, 0, 0); and white is represented with input data (I, R, G, B) of (0, 1, 1, 1) or (1, 1, 1, 1), thus providing fifteen colors available in total. Assume that: pure black is represented with input data (I, R, G, B) of (0, 0, 0, 0); light black is represented with input data (I, R, G, B) of (1, 0, 0, 0); dark white is represented with input data (I, R, G, B) of (1, 1, 1); and pure white is represented with (I, R, G, B) of (1, 1, 1, 1). Also assume that the lightnesses thereof are defined as follows: pure black<light black <dark white<pure white. Then, sixteen-color representation is realized. This is described below with reference to FIGS. 6 to 8.

Figure 6:
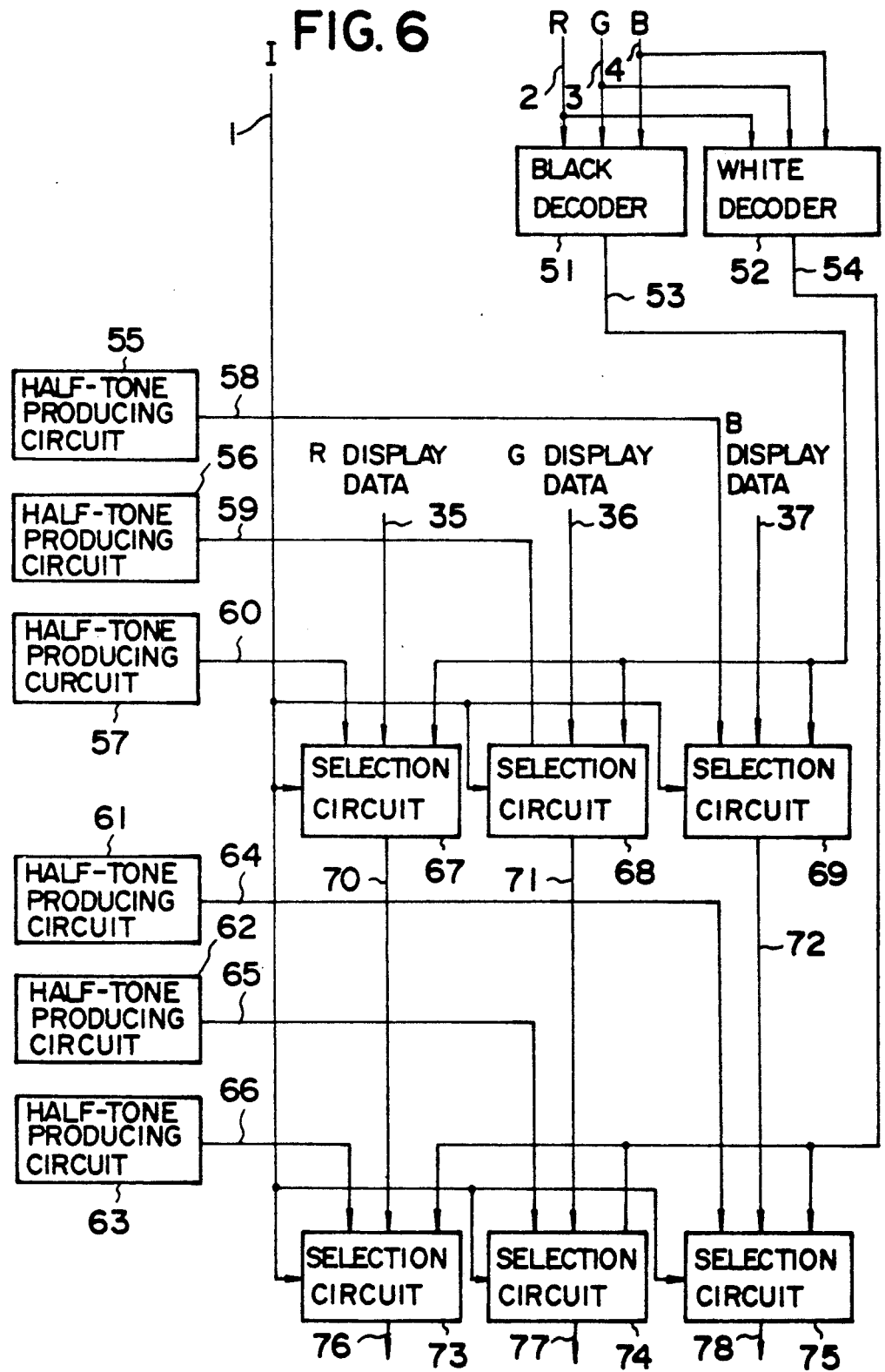
FIG. 6 is a block diagram showing a multi-color display system according to a second embodiment of the present invention.
Figures 7, 8:
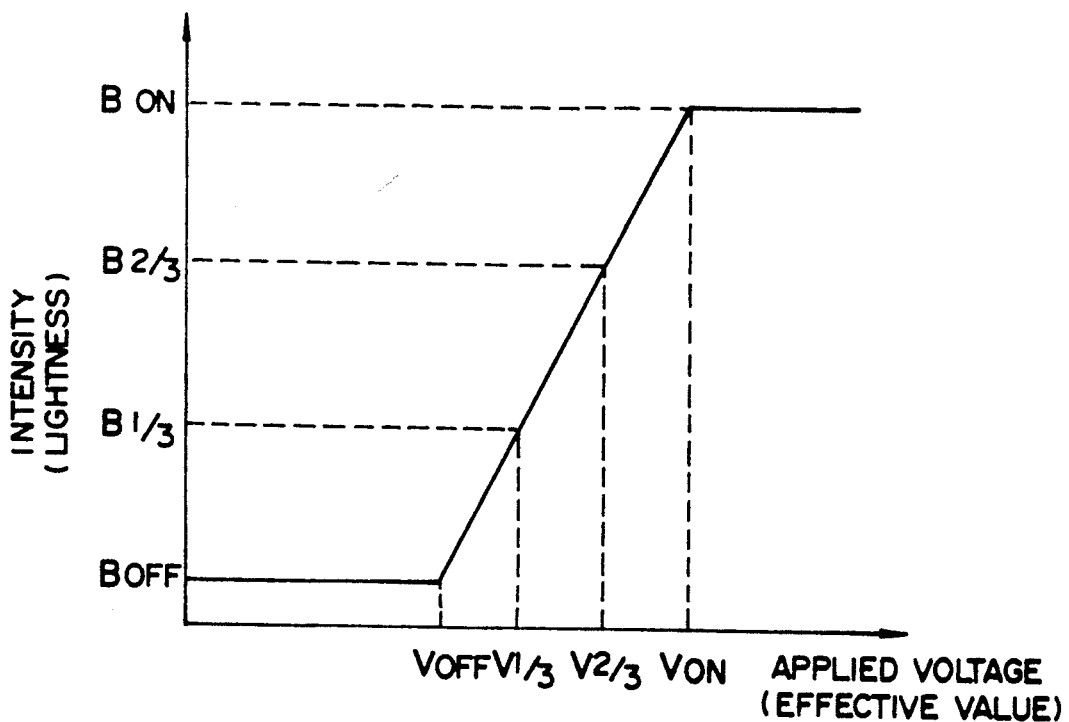
FIG. 7 is a table showing one example of color representations of pure black, light black, dark white and pure white in the multi-color display system according to the second embodiment of the present invention.
FIG. 8 is a graph representing the lightness or intensity characteristic of liquid crystal cells.

To attain sixteen-color representation, the circuit arrangement of FIG. 6 is inserted between the selection circuits 32-34 and the serial-to-parallel converter circuits 38-40 in FIG. 1. In FIG. 6, a black decoder for decoding (0, 0, 0) of (R, G, B) is indicated at 51, and a black indication signal is indicated at 53. The black indication signal 53 will be "1" when (R, G, B) is (0, 0, 0). A white decoder for decoding (1, 1, 1) of (R, G, B) is indicated at 52, and a white indication signal is indicated at 54. The white indication signal 54 will be "1" when (R, G, B) is (1, 1, 1). Also, black B half-tone producing circuit is indicated at 55; Black G half-tone producing circuit is indicated at 56; and Black R half-tone producing circuit is indicated at 57. Black B half-tone display signal is indicated at 58; Black G half-tone display signal is indicated at 59; and Black R half-tone display signal is indicated at 60. Each black half-tone producing circuit functions to provide the half-tone display signal of "1" during one frame out of three frames in this embodiment. White B half-tone producing circuit is indicated at 61; white G half-tone producing circuit is indicated at 62; and white R half-tone producing circuit is indicated at 63. White B half-tone display signal is indicated at 64. White G half-tone display signal is indicated at 65; and white R half-tone display signal is indicated at 66. Each white half-brightness producing circuit functions to provide the half-tone display signal of "1" during two frames out of three frames. Black R selection circuit is indicated at 67; black G selection circuit is indicated at 68; and black B selection circuit is indicated at 69. These selection circuits are responsive to input data I and black indication signal 53 for selecting display data. Black R selection circuit 67 functions to output R display data 70; black G selection circuit 68 functions to output G display data 71; and black B selection circuit 69 functions to output B display data 72. White R selection circuit is indicated at 73; white G selection circuit is indicated at 74; and white B selection circuit is indicated at 75. These selection circuits are responsive to input data I and white indication signal 54 for selecting display data. White R selection circuit 73 functions to output R display data 76; white G selection circuit 74 functions to output G display data 77; and white B selection circuit 75 functions to output B display data 78. FIG. 7 shows the display data when input data (I, R, G, B) is (0, 0, 0, 0), (1, 0, 0, 0), (0, 1, 1, 1) or (1, 1, 1, 1). FIG. 8 shows the relationship between effective voltage to be applied to liquid crystal cells and the associated lightness.

In FIG. 6, when input data (R, G, B) is (0, 0, 0) (that is, black indication signal 53 is "1") and input data I is "1", black R selection circuit 67 selects black R half-tone display signal 60; black G selection circuit 68 selects black G half-tone display signal 59; and black B selection circuit 69 selects black B half-tone display signal 58. When black indication signal 53 is "1" and input data I is "0", or when input data (R, G, B) is other than (0, 0, 0) (that is, black indication signal 53 is "0"), black R selection circuit 67 selects R display data 35; black G selection circuit 68 selects G display data 36; and black B selection circuit 69 selects B display data 37. These selected signals are outputted as R display data 70, G display data 71 and B display data 72. As for white R, G and B selection circuits 73, 74 and 75, when input data (R, G, B) is (1, 1, 1) (that is, white indication signal 54 is "1") and input data I is "0", white R selection circuit 73 selects white R half-tone display signal 66; white G selection circuit 74 selects white G half-tone display signal 65; and white B selection circuit 75 selects white B half-tone display signal 64. When white indication signal 54 is "1" and input data I is "1", or when input data (R, G, B) is other than (1, 1, 1) (that is, white indication signal 54 is "0"), white R selection circuit 73 selects R display data 70; white G selection circuit 74 selects G display data 71; and white B selection circuit 75 selects B display data 72. These selected signals are outputted as R display data 76, G display data 77 and B display data 78. These display data are directed to serial-to-parallel converter circuits 38 to 40 in FIG. 1.

As a result, when input data (I, R, G, B) is (0, 0, 0, 0); (1, 0, 0, 0); (0, 1, 1, 1) or (1, 1, 1, 1), the display data will be (0, 0, 0), ($\frac{1}{3}$, $\frac{1}{3}$, $\frac{1}{3}$), ($\frac{2}{3}$, $\frac{2}{3}$, $\frac{2}{3}$) or (1, 1, 1) respectively, as shown in FIG. 7 wherein "0" indicates "display OFF" in all frames; "$\frac{1}{3}$" indicates "display ON" during one out of three frames and "display OFF" in two out of three frames; and "1" indicates "display ON" during every frames. As shown in FIG. 8, the intensity or lightness of a liquid crystal cell varies with the effective value of voltage applied thereto. Assume that the lightness of liquid crystal cell in case of "display ON" in every frame is $B_{ON}$ (effective voltage value $V_{ON}$) and that the lightness of liquid crystal cell in case of "display OFF" in every frame is $B_{OFF}$ (effective voltage value $V_{OFF}$). Then, the effective voltage $V_{166}$ in case of "display ON" during one out of three frames and the effective voltage $V_{170}$ in case of "display ON" during two out of three frames are as follows:

$V_{OFF} < V_{\frac{1}{3}} < V_{\frac{2}{3}} < V_{ON}$, and therefore, $B_{OFF} < B_{\frac{1}{3}} < B_{\frac{2}{3}} < B_{ON}$ As may be understood from the above, addition of the circuit arrangement of FIG. 6 to that of FIG. 1 provides sixteen color representation.

In the first and second embodiments described above, different arrangement may be used to meet "display ON" during M frames out of N frames with values of M and N different from the particular example described above.

Figure 9:
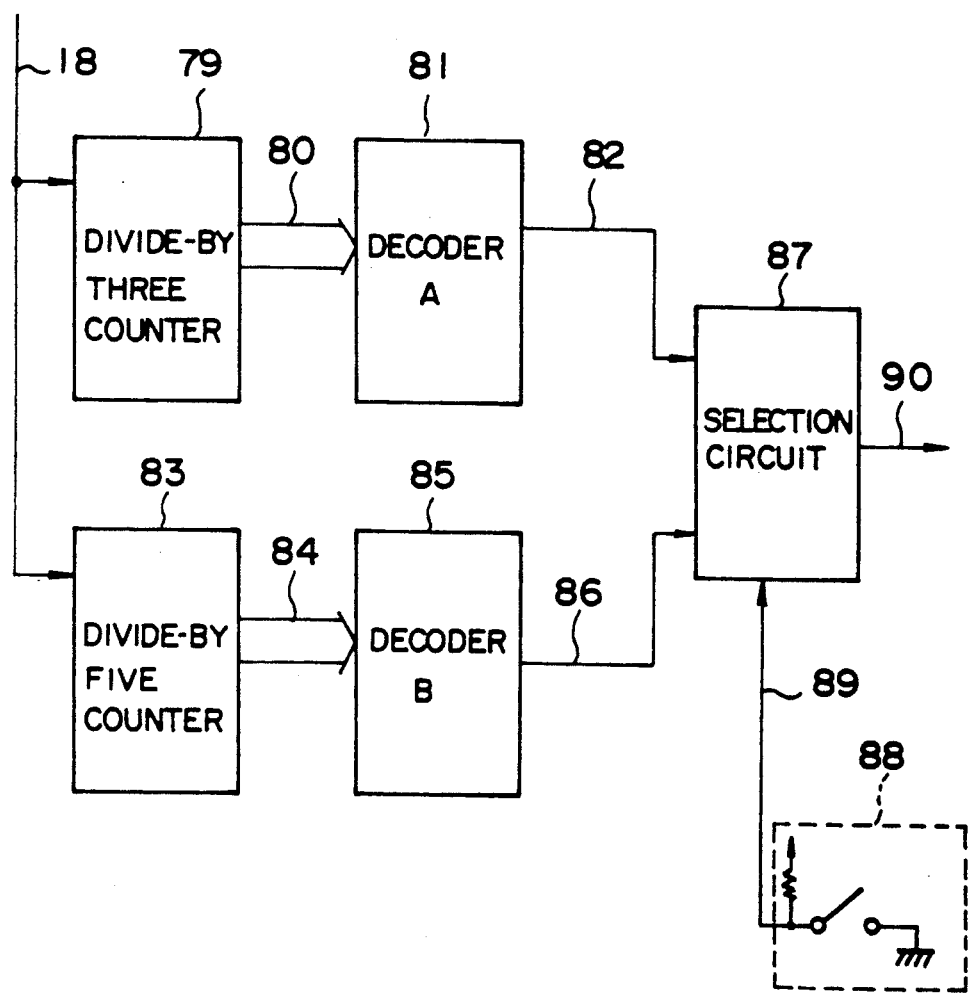
FIG. 9 is a block diagram of a programmable half-tone producing circuit.

Each half-tone producing circuit may be constructed as shown in FIG. 9, thereby permitting selection of one out of two on-frame timings. The selection is described below with reference to FIG. 9.

In the drawing, a divide-by-three counter is indicated at 79, and the count value is indicated at 80. The divide-by-three counter 79 counts the frame end signal 18, while outputting "0", "1" and "2" in a cyclic manner. Decoder is indicated at 81, and its decoded output is indicated at 82. The decoder 81 is responsive to the divide-by-three count 80 of "0" for outputting decoded value 82 of "1", and is responsive to the divide-by-three count of "1" or "2" for outputting decoded value 82 of "0". A divide-by-five counter is indicated at 83, and its count is indicated at 84. The divide-by-five counter 83 counts the frame end signal 18, while outputting "0", "1", "2", "3" and "4" in a cyclic manner. Another decoder is indicated at 85, and its decoded output is indicated at 86. The decoder 85 is responsive to the divide-by-five count 84 of "0" or "3" for outputting decoded value 86 of "1", and is responsive to input divide-by-five count 84 of "1", "2" or "4" for outputting decoded value 86 of "0". Also provided are selection circuit 87 and switching circuit 88 with divide-by-three to divide-by-five switching signal 89 applied thereto and with half-tone display signal 90 outputted therefrom. In FIG. 9, the divide-by-three counter 79 and the decoder 81 together function to provide decoded value 82 which is "1" during one frame out of three frames, whereas the divide-by-five counter 83 and the decoder 85 together function to provide decoded value 86 which is "1" during two frames out of five frames. The switching circuit 88 functions to selectively apply "1" or "0" as the switching signal 89 to the selection circuit 87. The selection circuit 87 is responsive to "1" for allowing decoded value 82 to pass therethrough, and is responsive to "0" for allowing decoded value 86 to pass therethrough, outputting either one as a half-tone signal 90.

As described above, the half-tone signal 90 will be "1" during one frame out of three frames or "0" during two frames out of five frames, depending on the switching action of the switching circuit 88. In this particular embodiment, a selection is made in two different on-frame timings, but the circuit arrangement of FIG. 9 can be modified to permit a selection among three, four ... or N different on-frame timings (N: integer). In this particular embodiment, a switching circuit is used to make a selection among the on-frame timings, instead, a register may be used, in which switching data may be written.

For the seven colors excluding white in the first embodiment, and for the six colors excluding white and black in the second embodiment, the frame thinning rate ("display ON" in M frames out of N frames) of R display data, G display data and B display data of "display OFF" is made constant when input data I is "1". The frame thinning rate of half-tone display signal can be varied for each color by providing for each color black R, G and B half-tone producing circuits, black R, G and B selection circuits and black decoder.

As may be understood from the above, more than eight color representation is permitted with three-primary display cells according to the present invention. Application of the present invention to a liquid crystal display panel advantageously prevents yield reduction caused by the thin film transistors and increases display duty cycle for the TN type. The number of represented colors is increased by permitting half-tone display of selected display cells which otherwise would be "display OFF", thus providing color representation of good quality and guaranteed free of irregular tone. The degree of half-tone may be changed with primary colors or with represented colors so as to compensate for irregular characteristics of the color filters used or to control the characteristics of represented colors.

We claim:

1. A multi-color display system in which each of visual information dots is composed of three liquid crystal cells each having a different primary color filter thereon to provide multi-color representation under ON-OFF control of each of the liquid crystal cells according to three bits of display data which are used to control the respective liquid crystal cells, characterized in that each of the liquid crystal cells is capable of being controlled to provide a half-tone representation with combination of said ON-OFF controls thereof according to a half-tone display signal which causes a selected liquid crystal cell to be in the "ON" state during M frames out of N frames (N>M), and that, for colors represented by said three liquid crystal cells at least one of which is in the "OFF" state, the liquid crystal cells to be in the "OFF" state are allowed to be controlled to provide said half-tone representation by substituting the half-tone display signal for bits of display data which indicate the "OFF" state, whereby more than eight colors are represented with said three liquid crystal cells.

2. The multi-color display system according to claim 1 wherein another half-tone representation of the liquid crystal cells is added for the color represented by the three liquid crystal cells which are all in the "ON" state and wherein the lightness of said another half-tone representation is higher than that of the half-tone representation for the color represented by the three liquid crystal cells which are all in the "OFF" state.

3. A multi-color display system in which each of visual information dots is composed of three primary-color display cells to provide multi-color representation under ON-OFF control of each of the display cells according to three bits of display data which are used to control the respective display cells, characterized in that each of the display cells is capable of being controlled to provide half-tone representation with combination of said ON-OFF controls thereof according to a half-tone display signal which causes a selected display cell to be in the "ON" state during M frames out of N frames (N>M), and that, for colors represented by said three display cells at least one of which is in the "OFF" state, the display cells to be in the "OFF" state are allowed to be controlled to provide said half-tone representation by substituting the half-tone display signal for bits of display data which indicate the "OFF" state, whereby more than eight colors are represented with said three display cells.

4. A multi-color display system comprising:
a display panel having a multitude of three primary-color display cells which are arranged in the form of matrix, each set of the three primary color display cells making up one dot of visual color representation under ON-OFF control of each of the display cells;
means for producing a half-tone display signal which causes a selected display cell to be in the "ON" state during M frames out of N frames (N>M); and
means responsive to said half-tone display signal and at least four-bit display data, three bits of which are used to control the respective three primary-color display cells, for substituting said half-tone display signal for any bit signal of said three bits depending upon the fourth bit of the display data, said any bit signal indicating the "OFF" state of a selected display cell.

5. The multi-color display system according to claim 4, wherein said means for producing a half-tone display signal is provided for each of the three primary colors, each of said means capable of having different sets of the values of N and M.

6. The multi-color display system according to claim 4, wherein said means for producing a half-tone display signal is provided for each of colors represented by the three primary colors, each of said means capable of having different sets of the values of N and M.

7. The multi-color display system according to claim 4, wherein said means for producing a half-tone display signal includes first means for producing a first half-tone display signal which causes a selected display cell to be in the "ON" state during M1 frames out of N1 frames (N1>M1); second means for producing a second half-tone display signal which causes a selected display cell to be in the "ON" state during M2 frames out of N2 frames (N2>M2); and means for selecting one of said first and second half-tone display signals to be outputted therefrom.

8. The multi-color display system according to claim 5, wherein said means for producing a half-tone display signal includes first means for producing a first half-tone display signal which causes a selected display cell to be in the "ON" state during M1 frames out of N1 frames (N1>M1); second means for producing a second half-tone display signal which causes a selected display cell to be in the "ON" state during M2 frames out of N2 frames (N2>M2); for selecting one of said first and second half-tone display signals to be outputted therefrom.

9. The multi-color display system according to claim 6, wherein said means for producing a half-tone display signal includes first means for producing a first half-tone display signal which causes a selected display cell to be in the "ON" state during Ml frames out of N1 frames (N1>M1); second means for producing a second half-tone display signal which causes a selected display cell to be in the "ON" state during M2 frames out of N2 frames (N2>M2); and means for selecting one of said first and second half-tone display signals to be outputted therefrom.

10. A multi-color display control apparatus used for a display device which includes a liquid crystal panel composed of a multitude of liquid crystal cells arranged in the form of matrix each of the cells having a different primary color filter thereon; and drive means adapted to receive several times a plurality of parallel display data to acquire a full line of display data such that a visual information dot is composed of a set of three liquid crystal cells aligned in a horizontal line, each of the cells being ON-OFF controlled according to the display data, the apparatus comprising:
means for producing a half-tone display signal which causes a selected liquid crystal cell to be in the "ON" state during M frames out of N frames (N>M);
means responsive to said half-tone display signal and at least four-bit display data, three bits of which are used to control the respective three primary color liquid crystal cells, for substituting said half-tone display signal for any bit signal of said three bits depending upon the fourth bit of the display data, said any bit signal indicating the "OFF" state of a selected liquid crystal cell;
serial-to-parallel conversion means for converting serial display data for each primary color outputted from said means for substituting into parallel display data; and
means for selecting parallel data of a predetermined number of bits out of said parallel display data for each primary color such that said parallel data meet the three primary color arrangement of the liquid crystal cells aligned in a horizontal direction.

11. A multi-color display system comprising a plurality of visual information dots, each dot being formed of three liquid crystal cells, each of the three liquid crystal cells having a different primary color filter thereon so as to provide multi-color representation under ON-OFF control of each of the liquid crystal cells, a plurality of selection means for enabling turn-on and turn-off of a respective liquid crystal cell of a dot in accordance with corresponding primary color bit data received thereby, the selection circuit means also being responsive to additional input bit data and respective half-tone display signals for controlling display of a respective liquid crystal cell of a dot in dependence upon a value of the additional information bit data and for supplying the respective half-tone display signal thereto as a substitute for a primary color bit data when the primary color bit data indicates an OFF-state of the respective liquid crystal cell so as to enable an increase in the number of colors available for display with the three liquid crystal cells.

12. The multi-color display system according to claim 11, wherein respective half-tone producing circuit means supply a respective half-tone display signal to an associated selection circuit means.

13. A multi-color display system according to claim 12, wherein a respective selection circuit means is responsive to a value 1 of the additional information bit data and a value 0 of the respective primary color bit data representing an off state of the respective liquid crystal cell of a dot for supplying the respective liquid crystal cell with the respective half-tone producing display signal.

* * * * *